R. C. BELL, W. H. ROBERSON & D. C. HINDERLITER.
TRAP.
APPLICATION FILED AUG. 27, 1914.
1,141,756.
Patented June 1, 1915.
3 SHEETS—SHEET 1.
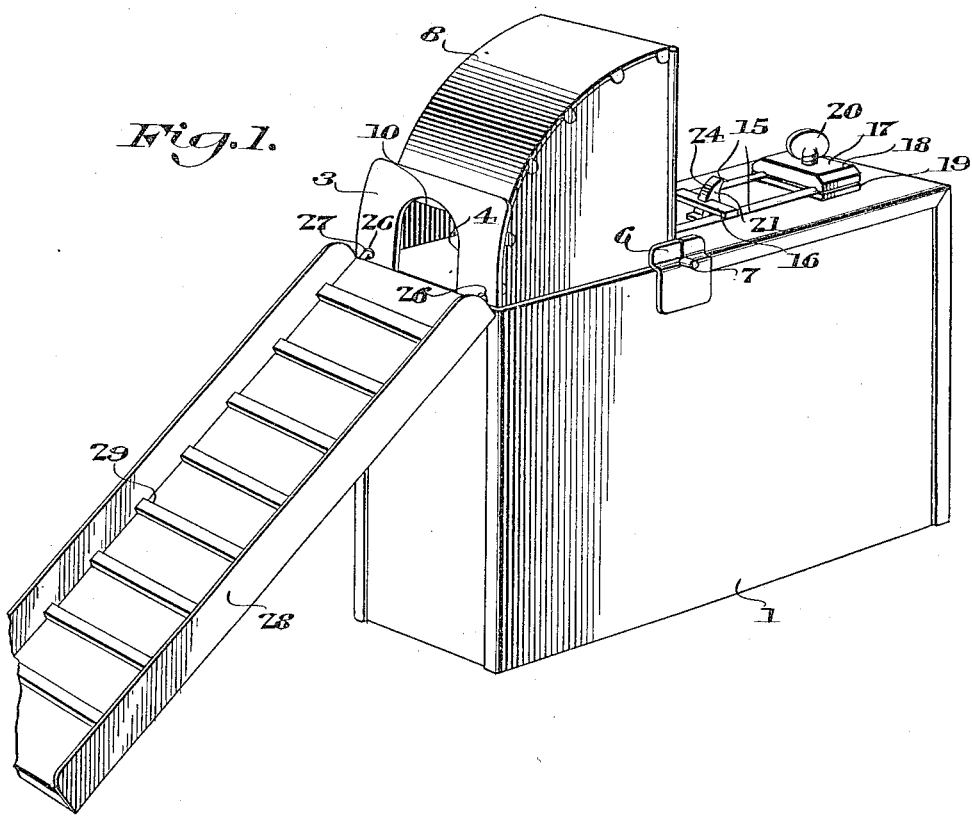
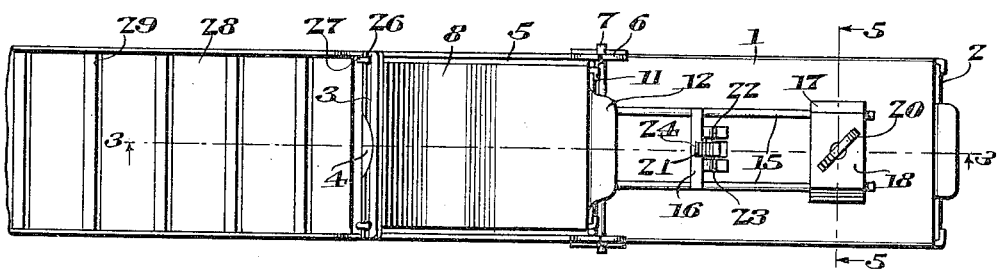
Inventors
Roscoe C. Bell,
William H. Roberson
& David C. Hinderliter
By Victor J. Evans
Attorney
Witnesses R. C. BELL, W. H. ROBERSON & D. C. HINDERLITER.
TRAP.
APPLICATION FILED AUG. 27, 1914.
1,141,756.
Patented June 1, 1915.
3 SHEETS—SHEET 2.
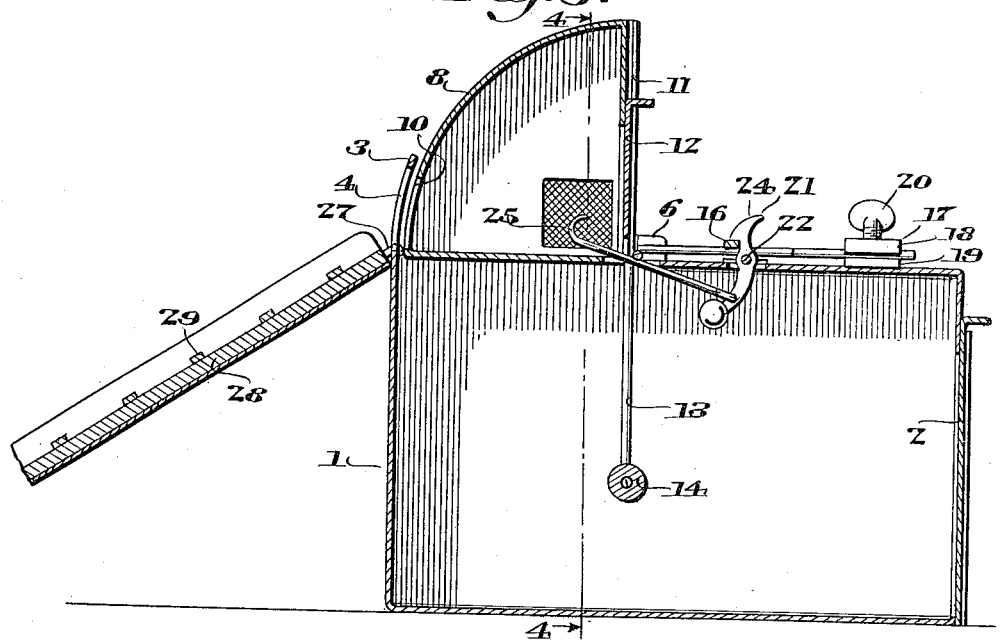
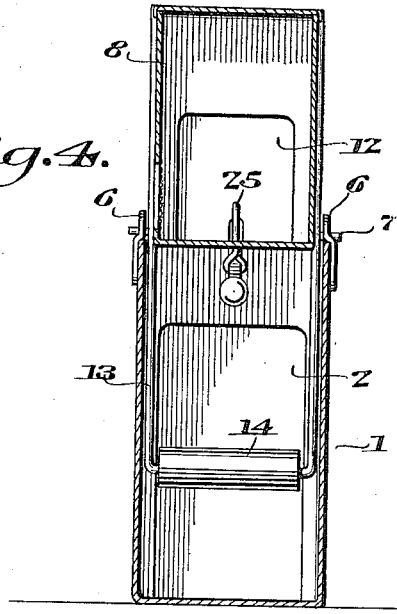
Witnesses
Inventors
Roscoe C. Bell,
William H. Roberson
& David C. Hinderliter
By Victor J. Evans
Attorney R. C. BELL, W. H. ROBERSON & D. C. HINDERLITER.
TRAP.
APPLICATION FILED AUG. 27, 1914.

1,141,756.

Patented June 1, 1915.
3 SHEETS—SHEET 3.

Witnesses

Inventors
Roscoe C. Bell,
William H. Roberson
& David C. Hinderliter
By Victor J. Evans
Attorney

UNITED STATES PATENT OFFICE.

ROSCOE C. BELL, WILLIAM H. ROBERSON, AND DAVID CLINTON HINDERLITER, OF MOUNT CARMEL, ILLINOIS.

TRAP.

1,141,756. Specification of Letters Patent. Patented June 1, 1915.

Application filed August 27, 1914. Serial No. 858,907.

*To all whom it may concern:*

Be it known that we, ROSCOE C. BELL, WILLIAM H. ROBERSON, and DAVID CLINTON HINDERLITER, citizens of the United States, residing at Mount Carmel, in the county of Wabash and State of Illinois, have invented new and useful Improvements in Traps, of which the following is a specification.

The present invention relates to improvements in animal traps.

In carrying out our invention we propose to provide a receptacle with a pivoted hood forming the entrance to the trap, the said hood being provided with counter-balancing weights, whereby the same is normally held in open operative position, a catch being employed for retaining the same in said position so that the hood will not be influenced by the weight of the animal entering the same, a trigger in the form of a bait hook being provided, and the same is connected with the retaining hook so that when the animal nibbles at the bait the hook will release the hood permitting the same to swing upon its pivots and precipitate the animal to within the closed receptacle.

We also aim to provide a trap of this class which is entirely automatic in action, both in setting and catching the animal, and further wherein the animal will be trapped before it can successfully remove the bait, so that one bait may be employed for an indefinite period.

With the above and other objects in veiw the improvement resides in the construction, combination and arrangement of parts set forth in the following specification and falling within the scope of the appended claim.

Figure 5:
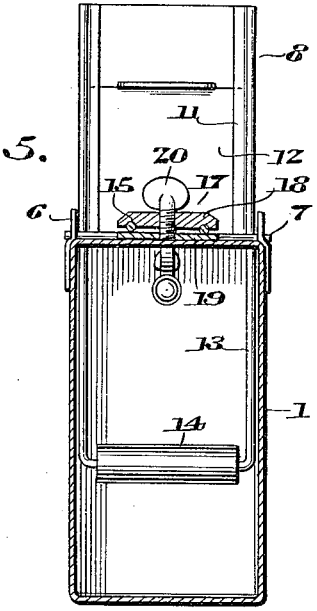
Figure 6:
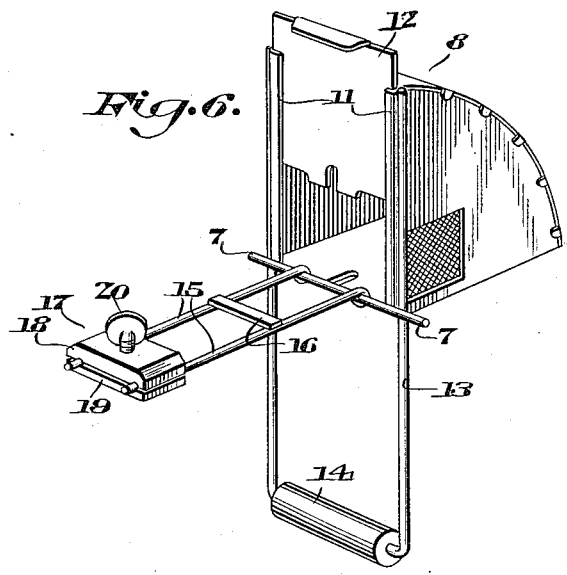

In the drawings: Figure 1 is a perspective view of a trap constructed in accordance with the present invention, Fig. 2 is a top plan view of the same, Fig. 3 is a central longitudinal sectional view approximately on the line 3—3 of Fig. 2, Fig. 4 is a transverse section approximately on the line 4—4 of Fig. 3, Fig. 5 is a detail transverse sectional view on the line 5—5 of Fig. 2, and Fig. 6 is a detail perspective view of the hood and its counterbalancing weight attachments, the rear door of the same being shown in a partly open position.

Referring now to the drawings in detail, the numeral 1 designates a substantially rectangular box or receptacle which is constructed of any suitable size to accommodate the animal to be trapped. The receptacle 1 is preferably provided with a partially open back which is formed with vertical inturned members or cleats providing ways for a slidable door 2. The front of the trap at the upper edge thereof is provided with an upwardly extending arcuate shield 3 which is centrally formed with an opening providing an entrance 4. The top of the receptacle, to the rear of the shield 3 is provided with a substantially rectangular opening, but the remainder of the top (except the opening for the door 2) is preferably closed. The side of the trap at the rear of the rectangular opening 5 is formed or provided with bifurcated lugs or cleats 6, and the perforations of the said cleats are adapted to serve as bearings for trunnions 7 provided upon the lower and rear corners of a hood 8. The hood 8 is of a sufficient size to be snugly received within the rectangular opening 5, and the front wall 9 of the hood is curved or of an arcuate formation and is arranged directly to the rear but out of frictional contact with the shield 3. The curved front, at the bottom wall or floor of the hood is provided with a transverse opening 10 which is partially closed by the shield 3, but the said opening registers with the opening 4 in the shield. The rear wall of the hood is provided with inturned cleats 11 providing ways for a slidable door 12. The hood at its rear portion is provided with a downwardly extending substantially U-shaped bail 13, the lower or connecting member of the same being provided with a weight 14. The hood has its rear portion also provided with a pair of parallel longitudinally extending bars 15 which have an approximately central transverse connecting plate 16.

The numeral 17 designates a weight which is arranged upon the bars 15. This weight comprises an upper plate 18 and a lower plate 19, a thumb screw 20 passing through a threaded opening in the lower plate providing means whereby the plates may be separated to permit of the longitudinal adjustment of the weight 17 upon the bars 15. This weight comprises an upper plate 18 and a lower plate 19, a thumb screw 20 passing through a suitable opening in the upper plate and through a threaded opening in the lower plate providing means whereby the plates may be separated to permit of the longitudinal adjustment of the weight 17 upon the bars 15.

The numeral 21 designates a catch which passes through an opening in the top plate of the receptacle 1 and which is provided with laterally extending trunnions 22 that are arranged in suitable bearings 23 in the said top of the receptacle. The catch 21 has its outwardly extending portion rounded to provide a hook 24, and its portion projecting within the receptacle weighted so that the hook will automatically swing into engagement with the connecting plate 16 of the bars 15 and so lock the hood against rotation. Connected with the portion of the hood projecting within the receptacle is a bait hook or trigger 25, the same passing through a suitable opening in the lower and rear portion of the hood, forward of its door 12, and the said trigger has its hooked end adapted to receive a bait. It will be noted that the bait is arranged at the rear of the hood, so an animal must fully enter the hood before he can obtain access to the bait. It will be further noted that when the animal nibbles upon the bait and attempts to remove the same from the trigger, the said trigger will actuate the hook 24 of the catch 21, releasing the hood and permitting the same to swing, by the weight of the animal to within the receptacle, which movement of the hood will precipitate the animal through the opening 10 to within the receptacle. Immediately thereafter the hood, by its counterbalancing weights, will be returned to its set position, the hook 24 of the catch 21 again engaging with the plate 16 of the bars 15, sustaining the said hook in operative position.

After the hood is elevated a distance above the ground or the floor upon which the receptacle rests we provide the top of the receptacle, at the connection with the shield 3 thereto, with a pair of openings 26, one being disposed adjacent each of the sides of the trap and the said openings are adapted to receive hooks 27 provided upon one end of an inclined platform or ladder 28, the same being provided with transverse cleats 29 to assist the animal in reaching the hood.

The catch is adapted to actuate as soon as the bait upon the trigger has been contacted, and by the particular and peculiar arrangement of the hook it will be noted that should the animal find himself slipping and attempts to turn and face the exit opening, the said movement will only hasten the tilting or swinging of the hook. It is to be understood that while the device has been described as a trap for animals, the same is not to be thus restricted in its useful capacity, as the trap may be set for birds or the like.

From the above description, taken in connection with the accompanying drawings, the simplicity of the device as well as the advantages thereof will, it is thought, be perfectly apparent to those skilled in the art to which such invention appertains without further detailed description.

Having thus described the invention, what we claim is:

In a trap, a receptacle having its top provided with an opening arranged at one end of the receptacle, an arcuate shield upon the end of the receptacle and projecting above the open top portion thereof, an inclined ladder connected with the end and leading to the opening in the shield, a hood trunnioned in bearings upon the top and closing the opening thereof, said hood having a curved front provided with an opening which registers with the opening in the shield and which is disposed directly to the rear of the shield, rods extending longitudinally from the rear of the hood over the top of the receptacle, a connecting bar for the rods, a pivoted catch having a weighted end, the hooked portion of the catch projecting through an opening in the top of the receptacle and engaging with the connecting bar of the rods for sustaining the floor of the hood flush with the top of the receptacle, a trigger comprising a wire having a hooked end, said trigger being connected with the weighted end of the receptacle and having its hooked end passing through an opening in the bottom of the hood at the rear of said hood, as and for the purpose set forth.

In testimony whereof we affix our signatures in presence of two witnesses.

ROSCOE C. BELL.
WILLIAM H. ROBERSON.
DAVID CLINTON HINDERLITER.

Witnesses:
J. S. RING,
R. R. STANSFIELD.

Copies of this patent may be obtained for five cents each, by addressing the "Commissioner of Patents, Washington, D. C."